United States Patent [19]

Bennett et al.

[11] 4,022,937
[45] May 10, 1977

[54] METHOD FOR DEPOSITING POWDER WITHIN CARBONACEOUS ARTICLE

[75] Inventors: Albert Bennett, Lewiston; Glenn R. Marin, Ransomville, both of N.Y.

[73] Assignee: The Carborundum Company, Niagara Falls, N.Y.

[22] Filed: June 23, 1975

[21] Appl. No.: 589,103

Related U.S. Application Data

[62] Division of Ser. No. 374,741, June 28, 1973, Pat. No. 3,903,838.

[52] U.S. Cl. .................................. 427/180; 118/6; 118/7; 118/319; 118/320; 118/326
[51] Int. Cl.² .................................. B05D 1/12
[58] Field of Search .................. 118/6, 7, 309, 319, 118/320, 326; 427/180; 428/408

[56] References Cited

UNITED STATES PATENTS

| | | | |
|---|---|---|---|
| 2,418,420 | 4/1947 | Moberly | 427/180 |
| 2,755,199 | 7/1956 | Rossheim et al. | 427/180 X |
| 3,131,089 | 4/1964 | Grulke et al. | 428/408 |
| 3,359,128 | 12/1967 | Humphrey et al. | 427/180 X |
| 3,434,416 | 3/1969 | Testone | 118/326 X |
| 3,794,509 | 2/1974 | Trauger et al. | 244/110 A X |
| 3,859,158 | 1/1975 | Park | 264/29 X |

FOREIGN PATENTS OR APPLICATIONS

| | | | |
|---|---|---|---|
| 770,073 | 10/1967 | Canada | 427/180 |
| 1,003,597 | 9/1965 | United Kingdom | 427/180 |

*Primary Examiner*—Ronald H. Smith
*Assistant Examiner*—Shrive P. Beck
*Attorney, Agent, or Firm*—David E. Dougherty; Raymond W. Green

[57] ABSTRACT

A method is disclosed for depositing finely divided solid additive upon surfaces of carbon cloth layer components of a carbonaceous article. The method comprises placing a layer of carbon cloth on a support, beneath a dispersion chamber, dispersing the powdered particulate additive within the chamber by blowing with a stream of gas (preferably nitrogen); allowing the additive to settle; and repeating this routine until the desired thickness of carbon cloth layers and powder is accumulated.

3 Claims, 14 Drawing Figures

METHOD FOR DEPOSITING POWDER WITHIN CARBONACEOUS ARTICLE

This is a division of copending application Ser. No. 374,741, filed June 28, 1973, now U.S. Pat. No. 3,903,838.

BACKGROUND OF THE INVENTION

Over the past years, articles of carbon and graphite have found increasing use in commercial applications of many kinds, the main development being in the increasing use of reinforced carbon and graphite articles which have improved physical properties and increased oxidation resistance at high temperatures. Bodies of this type are increasingly used in the aerospace and aviation fields, where resistance to corrosion, high temperature, thermal shock and excellent wear characteristics are required of the material to be used. In this connection articles consisting essentially of carbon or graphite fibers bound by a carbon or graphite matrix into a integral body have been found to be exceedingly useful. Reinforced carbon and graphite articles and the method of producing them is disclosed by Rohl and Robinson U.S. Pat. No. 3,462,269, entitled "Process for Producing Reinforced Carbon and Graphite Bodies." Another method for producing laminated graphite articles is disclosed in U.S. Pat. No. 3,174,895 to Gibson et al.

A carbon or graphite article having improved oxidation resistance and increased strength is disclosed in U.S. Pat. No. 3,672,936 to Ehrenreich, the desired properties being achieved by the incorporation of the in situ reaction product of carbon and a boron containing additive. These carbon or graphite articles will retain high strength at temperatures on the order of 1000° C. In addition, the coefficient of friction may be controlled by the choice of additive, so that a carbon or graphite article may be produced which has a coefficient of friction either substantially reduced, compared to that of a conventional carbon body, or else greater than that of a conventional body. This control of properties is, of course, highly desirable in the manufacture of carbon friction elements such as brake discs.

Carbon articles such as brake discs can be produced by forming carbon fibers into a suitable shape, pressure impregnating a carbonizable binder into the fiber shape, and firing the impregnated shape at sufficient temperature in an inert atmosphere to carbonize the binder, thereby causing the fibers to be bound into an integral body with a carbon binder. The impregnating and carbonizing steps can be repeated a number of times until the density of the article is at the desired level, normally 1.4 grams/cc. and higher. The carbon fiber shapes can be produced by building up layers of carbon cloth, a suitable additive being dispersed in the fiber shape in the form of finely divided particles between the fiber layers as the fibrous shape is being produced. To give the best reinforcing effect, the particle sizes of the additive are preferably on the order of 250 microns or smaller and the additive must be distributed uniformly over the surface of the carbon fiber. A satisfactory friction disc may comprise a considerable number of layers of carbon cloth, each layer of which should desirably have a uniform coating of the additive. The process for building up the discs has been rather tedious and difficult, due to the difficulty of distributing the additive in a uniform coating and to dusting and loss of additive due to the extremely fine particle size used. An apparatus of a semi-automatic type on which the discs could be assembled and the additive dispersed in a controlled manner is therefore desirable for the proper assembly and fabrication of carbon or graphite brake discs.

SUMMARY OF THE INVENTION

The invention pertains to an apparatus for applying additives upon the surfaces of carbon cloth layer components of carbonaceous articles, the apparatus having a frame supporting a horizontal flat working surface and a flat movable transfer arm supported on the working surface. The arm carries at least one platen for holding the carbon cloth layers of the carbonaceous article. The apparatus also has a dispersion chamber supported by the frame and over the platen, the chamber having an open end above the platen. A blowing tube is attached to the dispersion chamber and enters it from one side, the inner end of the tube being above the platen while the outer end of the tube is connected to a chamber for receiving a charge of additive. The charge of additive is blown through the tube and discharged within the dispersion chamber by a suitable flow of gas, the discharged additive then falling upon the carbon cloth layers. The transfer arm may support two platens and has means for back and forth motion of the platens beneath the dispersion chamber, the apparatus having semi-automatic means for charging and dispersing measured quantities of additive within the dispersion chamber, thereby applying controlled amounts of the additive to the carbon cloth on the platens. The apparatus greatly simplifies the operations required to form carbonaceous articles, such as carbon friction discs which are built-up from many layers of carbon cloth, each layer requiring a separate deposit of additive as the disc body is assembled.

DETAILED DESCRIPTION

The apparatus of the invention provides a means for manufacturing an additive containing carbonaceous article, especially one which is built-up from layers of carbon fibers, each layer receiving a coating of additive during assembly of the article. The apparatus is specially adapted for the assembly of carbonaceous friction elements from layers of carbon cloth, wherein the steps of adding a controlled amount of additive during the assembly of cloth layers is performed automatically, thus eliminating manual operations other than those of feeding the layers of cloth to the apparatus and charging the additive to a feed hopper.

Figure 1:
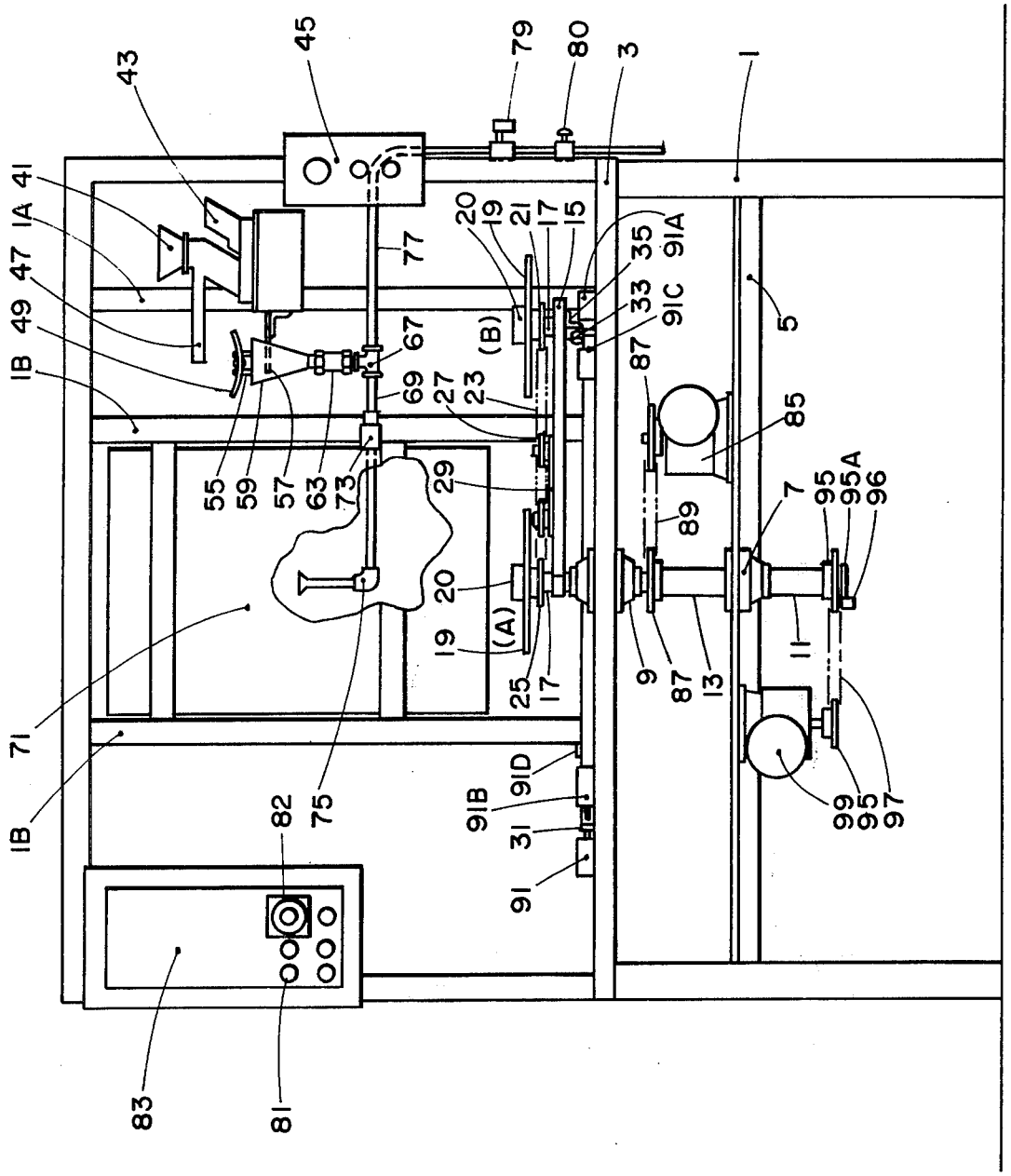
FIG. 1 is a front view of the powder dispersion apparatus.
Figure 3:
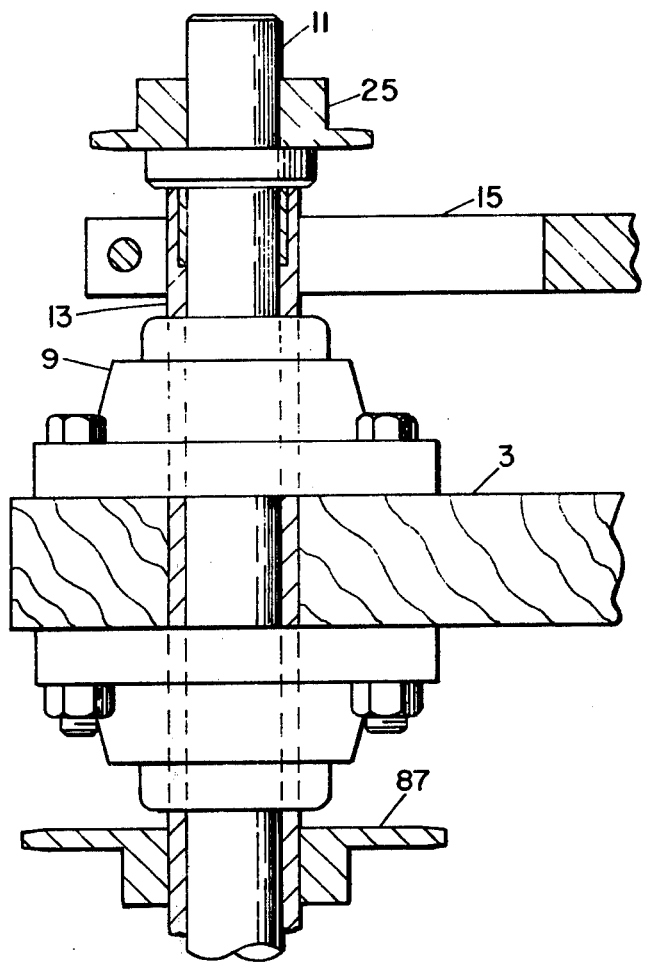
FIG. 3 is a more detailed front view of the transfer and rotation shafts as mounted in a large flanged bearing.
Figure 4:
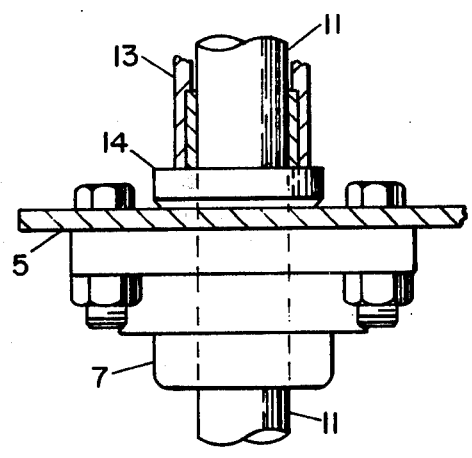
FIG. 4 is a detailed front view of a lower flanged bearing.
Figure 9:
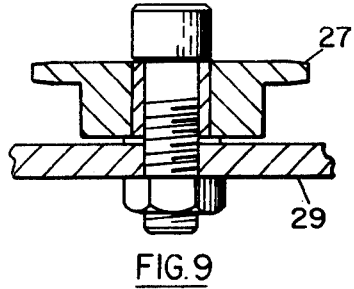
FIG. 9 is a sectional view of the take-up sprocket mounting.

A front view of the apparatus is shown in FIG. 1, in which a steel framework 1, supports a horizontal work surface 3 at approximately normal table height above a floor or other supporting surface for the apparatus. Two horizontal cross-members 5 are attached to the framework 1, below the work surface 3 and parallel thereto. A flanged bearing 7, supported by cross-member 5, and a larger flanged bearing 9, support a vertically disposed rotation shaft 11. The large bearing 9 passes through and is supported by the work surface 3; the bearing support being shown in greater detail in FIG. 3. Bearing 9 also encloses a tubular transfer shaft 13, this shaft surrounding and being concentric with the upper part of rotation shaft 11. The lower end of the shaft 13 is supported upon a ball thrust bearing 14 which rests upon the cross member 5 (see FIG. 4). A T-shaped transfer arm 15 is attached to the transfer shaft 13 while the upper cross-bar of the T contains a short vertical bearing 17 at each end, each bearing serving as a support for a circular platen 19. Each platen is capable of free rotation upon its shaft, this rotation being imparted by a sprocket 21 mounted beneath each platen, the two platen sprockets being driven by a sprocket chain 23 which in turn is driven by sprocket 25 which is attached to the upper end of rotation shaft 11. Sprocket chain 23 is held by two idler sprockets 27 which are mounted on an adjustable take up plate 29 (see FIG. 9), which is in turn mounted on transfer arm 15.

Figure 7:
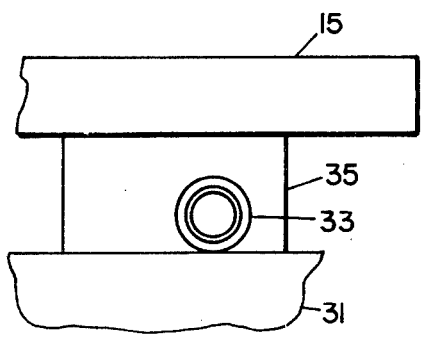
FIG. 7 is a detailed front view of the supporting member for the transfer arm.
Figure 8:
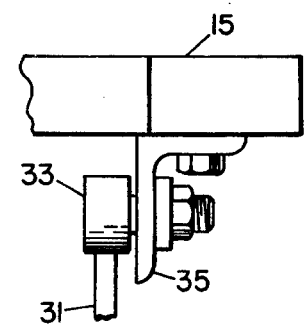
FIG. 8 is a end view of the members shown in FIG. 7.

Transfer arm 15 is capable of back and forth movement in a direction parallel to the work surface 3, this movement being supplied by transfer shaft 13. The ends of the transfer arm 15 are guided and supported during this movement by the curved guide rail 31 supporting a rotary cam follower 33. This means of support is shown in greater detail in FIGS. 7 and 8 which show a vertical arm support 35, attached to the lower surface of the transfer arm 15, this support carrying the cam follower 33 which engages the top of the curved guide rail 31. Since the arm supports are positioned beneath the ends of the transfer arm 15 which support the platens 19, they provide support for the weight of the carbon articles which are carried on the platens during operation of the apparatus.

Figure 10:
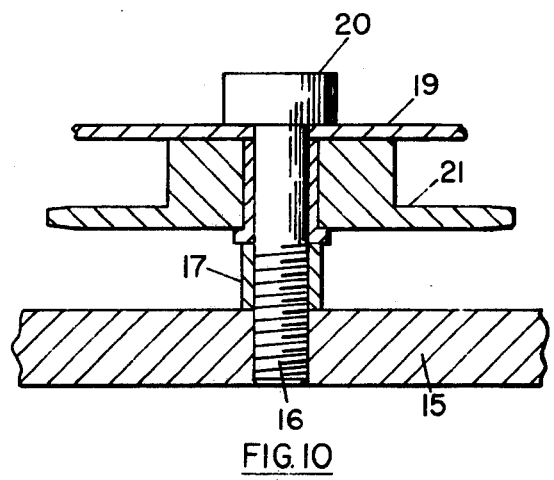
FIG. 10 is a sectional view of the sprocket and platen mounting.

A more detailed view of the platen assembly is shown in FIG. 10. A cap screw 16 is attached within a suitable threaded opening in the transfer arm 15, the shaft of this screw carrying the short concentric cylindrical bearing 17, on which the sprocket 21 and its attached platen 19 can rotate. The head of the cap screw holds the platen assembly in place. A short cylindrical member 20 is attached to the platen 19 to act as a center guide for carbon discs placed on the platen during machine operation.

Figure 11:
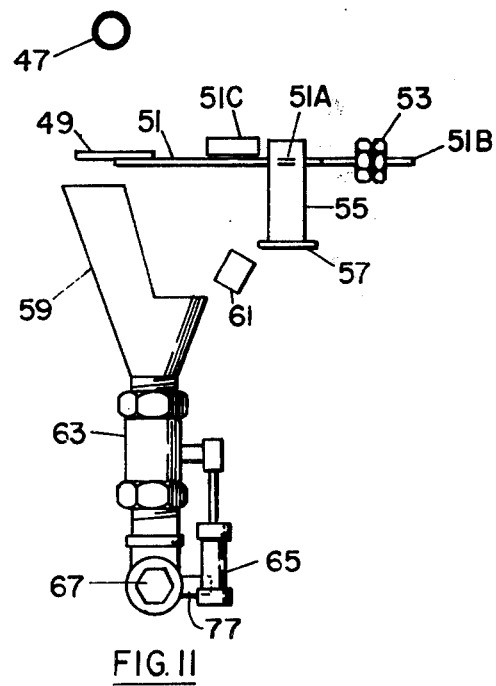
FIG. 11 is an end view of the dump hopper and additive feed assembly.

A quantity of powdered additive is charged to the feed hopper 41 of a vibratory feed 43 (see FIG. 1). This feeder is supported by a vertical frame column 1A, this column being a vertical extension of the frame 1. The vibratory feeder is electrically driven through the controller 45. During operation, a fine stream of additive is discharged from the end of the feeder tube 47, the additive falling upon and being collected by a measuring paddle 49. This paddle is a short concave shaped piece of magnetic metal which is attached to a rod 51, (see FIG. 11) the rod having a pivot point 51A and a threaded extension 51B on which several threaded nuts 53 may be moved to provide an adjustable balancing means for the measuring paddle 49. An electrical mercury switch 51C is fastened to rod 51. The measuring paddle and rod assembly is supported by, and pivots within a paddle holder 55, the paddle holer in turn is supported by a paddle support 57 which is fastened to the frame column 1A (FIG. 1). The nuts 53 are adjusted to permit the paddle 49 to drop down when a measured amount of additive has been deposited, this additive then falling into a dump hopper 59 which is positioned directly below the paddle. The paddle is then held in this lower position by magnetic attraction to an electromagnet 61. As the paddle and rod assembly drops to this lower position, the mercury switch 51C shuts off the power to the feeder 43, thereby stopping the discharge of additive from feeder tube 47.

Figure 12:
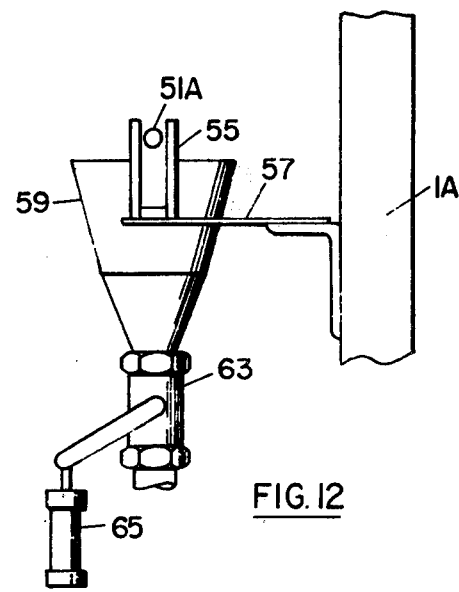
FIG. 12 is an end view of the feed paddle holder and support.

The dump hopper 59 is supported by a one-inch ball valve 63, this valve being normally closed, but which is opened momentarily by a gas piston actuator 65 to allow the measured charge of additive to drop into a two inch tee 67. The arrangement of dump hopper 59, valve 63 and tee 67 are shown in FIG. 1 and in greater detail in FIGS. 11 and 12. When the measured charge of additive has been deposited in tee 67, actuator 65 closes valve 63 and electro magnet 61 is de-energized, permitting the paddle 49 to return to its horizontal position for receiving another charge of additive from feeder tube 47.

The dump hopper and valve assembly are attached to a large dispersion chamber 71 by means of a discharge tube 69. The dispersion chamber is a large cylinder of about 55 gallon capacity, the upper end being closed, the lower end open. The chamber is supported by vertical frame columns 1B, as shown in FIG. 1, the discharge tube 69 entering through one side of the chamber and secured thereto by appropriate fittings 73. The discharge tube extends into the center of the chamber and is then directed vertically by elbow 75 so that a discharge from the tube is directed toward the upper region of the chamber. During operation, the additive deposited in the tee 67 is blown in a whirling motion through the discharge tube 69 by means of a stream of gas such as compressed nitrogen or dry air which enters the side of the tee through tube 77. The stream of gas is controlled by solenoid valve 79 and metering valve 80. The position of one of the platens beneath the dispersion chamber is shown in FIG. 1, whereby it is apparent that the additive material blown into the upper region of the chamer 71 through the discharge tube 69, will quickly settle out in a fine uniform layer over the surface of the carbon cloth layers supported on the platen beneath the chamber. The movements of the platens are electrically controlled by suitably positioned limit switches 91, 91A, 91B, 91C and 91D (see FIG. 2) which are mounted on the work surface 3, adjacent to guide rail 31. The function of these switches will be explained during the description of machine operation which follows.

Figure 2:
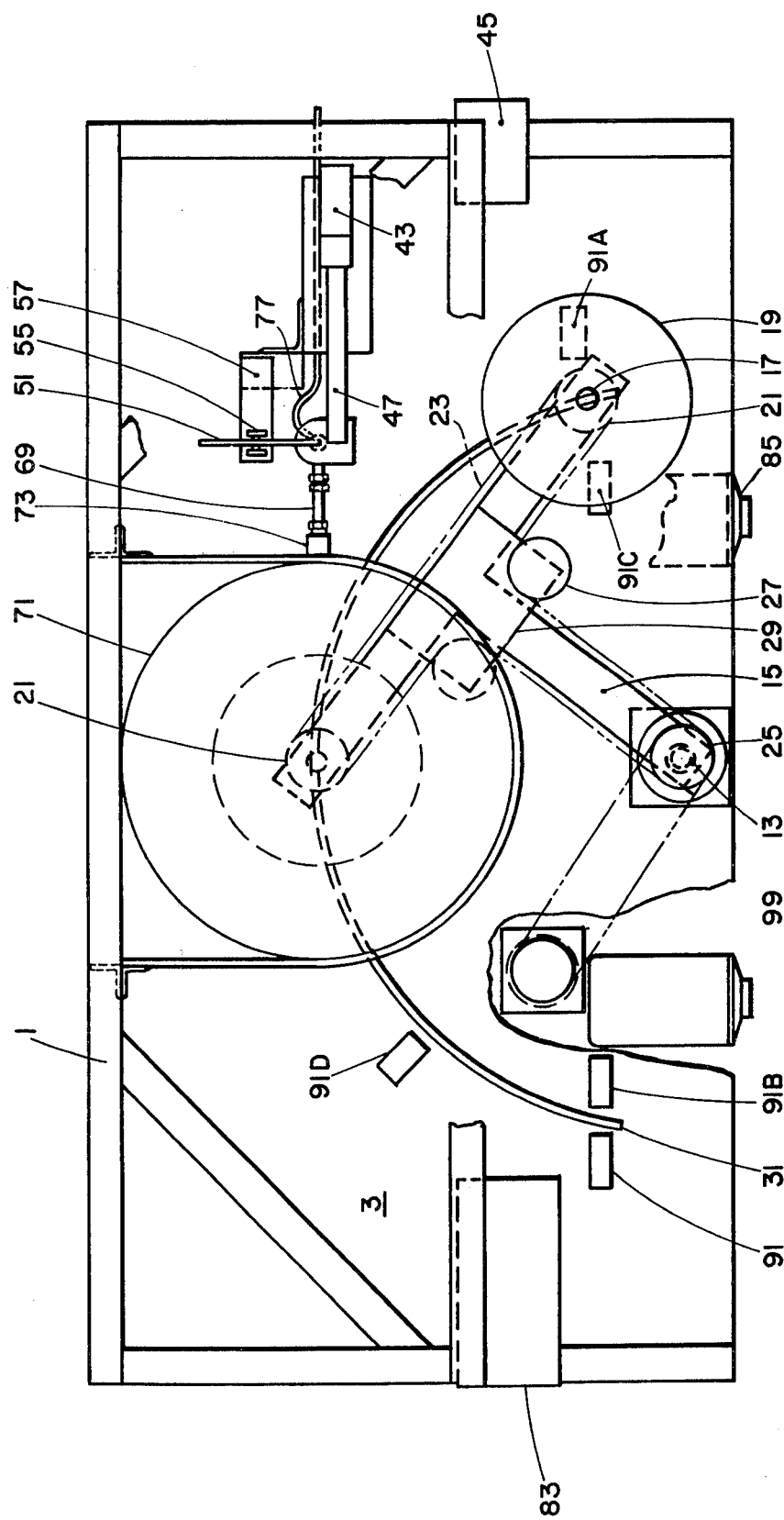
FIG. 2 is a top view of the powder dispersion apparatus.

The operation of the apparatus can best be visualized by referring to FIGS. 1 and 2, and showing the two platens as (A) and (B) respectively. As shown in FIG. 1, platen (B) is in position for the addition of a work piece. This is preferably a disc of carbon or graphite cloth, having a hole in the center which allows it to slip over guide member 20 and lie flat on the platen. A supply of powdered additive is charged to the hopper 41 and the apparatus then put in motion by pressing a star button 81 on a control cabinet 83. At the time the start button 81 is pressed, a reversible motor 85 is activated. This motor is fastened to the horizontal cross-members 5 and includes a gear motor reducer through which the motor power is transmitted to the tansfer shaft 13 by means of sprockets 87 and sprocket chain 89. The action of this motor rotates the transfer shaft through an angle of about 70° to 80°, moving the attached transfer arm 15 through the same angle and thereby removing platen (A) from beneath the dispersion chamber 71 while simultaneously placing platen (B), which carries the layers of carbon cloth, in its place.

As the transfer arm 15 starts its movement, the limit switch 91A (FIG. 2) is activated to turn on electrical current to a double acting solenoid valve, (not shown) which admits compressed air or nitrogen to the piston drive 65, which then opens the ball valve 63. At the same time both platens (A) and (B) are turned through a pre-set rotational angle. The movement of the transfer arm 15 is stopped in the second position by the limit switch 91B attached near the guide rail 31 at a point 93 (see FIG. 2), the switch shutting off the motor 85 and also shutting off current to the solenoid valve controlling the ball valve actuator 65. At this point, the ball valve 63 closes and a thermal time delay unit (not shown) which is in the control cabinet 83 is activated to allow a delay of about one second before the solenoid valve 79 on the gas line is activated, allowing a flow of compressed gas to enter the tee 67. A second timing unit (not shown) in cabinet 83 holds valve 79 open for 3 to 5 seconds and then closes it. During this time, the vibratory feeder 43 is activated and this drops additive into the measuring paddle 49. As the measuring paddle dumps its charge into dump hopper 59, the mercury switch 51C (FIG. 11) shuts off the feeder 43 during the time the measuring paddle 49 is in its dumping position. As previously explained, the paddle 49 is held momentarily in this lower dumping position by the electromagnet 61. A third timing unit (not shown) within control cabinet 83 is set to allow the platen (B) to remain in place under chamber 71 for a sufficient time to allow the dispersed additive to settle out as a uniform coating upon the carbon cloth held by platen (B). This time interval may range from 10 to 60 seconds, depending on the settling time of the additive. During this time, platen (A) is in loading position outside the dispersion chamber and may receive a disc of carbon cloth positioned thereon in the same manner as that of platen (B).

After this time interval, the motor 85 is reactivated in the reverse direction to return platen (A) to position beneath chamber 71 and platen (B) to its starting position outside the chamber, the transfer arm being halted again by the limit switch 91E (See FIG. 2). As soon as the transfer arm starts its movement, limit switch 91 (FIG. 2) activates the piston drive 65 and opens ball valve 63 to allow the additive charge to drop into the tee 67. When the transfer arm stops, platen (A), holding a disc of carbon cloth, is now in position beneath the dispersion chamber 71 and limit switch 91C activates piston drive 65 to close ball valve 63. At the same time the electromagnet 61 is de-activated, allowing measuring paddle 49 to rise. Mercury switch 51C then activates feeder 43 which in turn supplies another charge of additive to the paddle 49. Also during this interval the one second thermal time delay unit in cabinet 83 is again activated. This then opens the solenoid valve 79 on the gas line, allowing a second flow of compressed gas to enter the tee 67 and blow the additive charge therein out through discharge tube 69 and into the upper region of the dispersion chamber 71. The additive then settles out in an even layer upon the surface of the carbon cloth held on the platen below the chamber. During the blowing period, the measuring paddle 49 dumps another charge of additive into dump hopper 59, as previously described. Also as previously described, the second timing unit in cabinet 83 allows the solenoid valve 79 to remain open for only a 3 to 5 second interval and then shuts off the gas flow while the third timing unit in control cabinet 83 is set to allow an additive settling period of about 10 to 60 seconds. At the end of this period, the motor 85 is again activated to move the transfer arm 15, removing the platen (A) with its coated disc to permit the manual addition of another disc. This movement also brings platen (B) into position beneath the dispersion chamber and activates piston drive 65 to open ball valve 63, allowing another charge of additive to drop into the tee 67. A second layer of carbon cloth having been manually added to the platen (B), the process is repeated automatically, additional layers of cloth being added alternately to the platens until fiber shapes of the desired thickness are built-up. A cycle counter 82 may be adjusted to automatically stop the apparatus after a pre-set number of transfer arm movements have been made, thus allowing a time interval for disc removal from the platen and clean out of residual additive from the chamber 71.

Figure 5:
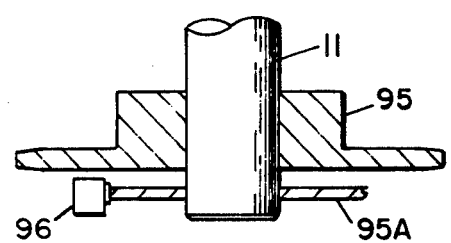
FIG. 5 is a side view of the lower end of the rotation shaft, showing a four-lobed cam attachment.
Figure 6:
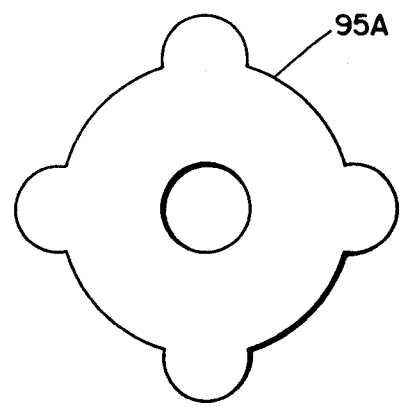
FIG. 6 shows an end view of the four-lobed cam of FIG. 5.

For articles formed in this way from build-up layers of material, it is desirable that the plies of each layer run in different directions so that maximum strength is distributed in a controlled manner in the finished article. This distribution is achieved by causing the platens to turn through a small angle of rotation between successive additions of cloth. As previously described, each platen is supported on an attached sprocket 21 which is free to rotate upon a cap screw shaft 16 (see FIG. 10.) The sprockets 21 are driven by a chain 23 which receives its motion from sprocket 25, mounted on the upper end of rotation shaft 11, as previously described. The lower end of shaft 11 extends downward from flanged bearing 7 and is rotated by sprockets 95, connected by a sprocket chain 97 and driven through a gear motor reducer by a motor 99 which is supported by the horizontal cross-members 5. When the transfer arm 15 is activated in counter clockwise movement to shift the position of the platens, the motor 99 is activated momentarily by limit switch 91D to turn the platens and the material carried thereon a preset angle of rotation, thus insuring that the plies of a succeeding layer of material placed on the platen will not coincide with the plies of the layer below. The motor 99 is stopped, after shaft 11 has been turned through a pre-set angle, by a limit switch 96, this switch being positioned in engagement with a suitable cam 95A, attached to the lower end of rotation shaft 11 (see FIG. 5). An end view of the cam is shown in FIG. 6. The cam shown has 4 lobes to allow 90° rotation of shaft 11 for each cycle. Other cams may be substituted to allow varying degrees of rotation as desired. The rotation of cam 95A, acting upon switch 96, shuts off the current to motor 99 at each pre-set turn of shaft 11, thus insuring a positive pre-set rotation of each platen between successive additions of the carbon discs.

Figure 14:
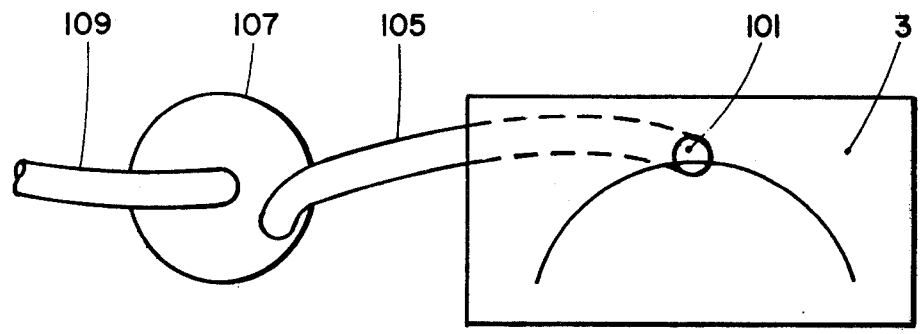
FIG. 14 is a top view of the recovery system shown in FIG. 13.
Figure 13:
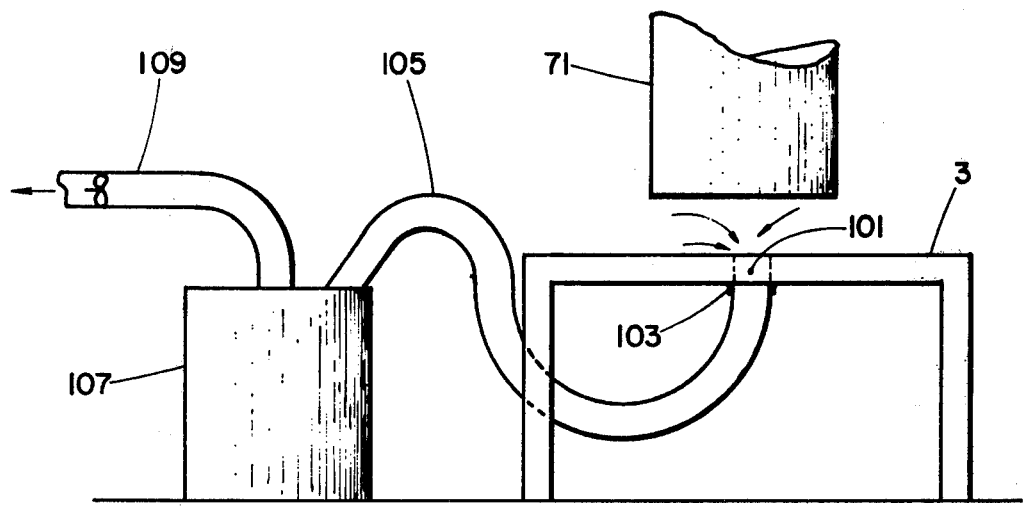
FIG. 13 is a side view of an additive recovery system.

The platens and carbon discs carried thereon are somewhat smaller in diameter than the internal diameter of the dispersion chamber 71, therefore some of the additive falls on the work surface 3. For removal of this additive, the surface 3 has an opening 101 (see FIG. 13) which contains a suitable sleeve 103 for connection to a flexible duct tube 105. The duct tube discharges into a collector chamber 107. The additive is swept into the opening 101 at periodic intervals and is drawn through the duct 105 into collector 107, under the action of a suitable exhaust fan (not shown) which is attached to an exhaust duct 109. A suitable filter bag (not shown), attached to the duct 109 within collector chamber 107, prevents loss of additive through the exhaust fan. The collector chamber may be emptied periodically and the recovered additive used again. A side view of the recovery system alone in relationship to the work surface and distribution chamber is shown in FIG. 13; the other parts of the apparatus have been omitted from this drawing to help clarify the illustration of the recovery system. FIG. 14 shows a top view of the system.

It is apparent from the above description of operation that the use of the apparatus of the invention will greatly expedite the assembly of built-up carbon articles such as disc friction elements. The addition of the additive to the disc has been made semi-automatic, thereby insuring uniform application of the additive over the area of each carbon cloth added during the fabrication of the disc. The amount of additive dispersed in any portion of the shape should not exceed about 3½% by volume of that portion in the finished article; a preferred amount of additive addition is that resulting in about 1¼ volume percent in the finished article. The apparatus of the invention may be easily adjusted to consistently apply the additive in nearly any amount desired during fabrication of the carbon shape, while the type of additive may also be changed as desired.

Ditungsten boride is a preferred additive for graphite or carbon friction elements. Other additive materials which can be used with these elements to enhance the oxidation resistance, frictional qualities or other properties, include boron, niobium, silicon, tantalum, titanium, tungsten and zirconium; other borides of tungsten, and borides of niobium, silicon, tantalum, titanium and zirconium; carbides of boron, niobium, silicon, tantalum, titanium, tungsten and zirconium; and nitrides of aluminum, boron, niobium, silicon, tantalum, titanium, tungsten and zirconium. When dispersed as finely divided particles, it is preferred that these additives have an average particle size ranging from about 50 microns to about 250 microns.

The fabrication of carbon friction elements by the step-wise assembly and coating with additive of individual layers of carbon fibers is a time consuming and tedious operation when all steps are performed manually. The apparatus of the invention performs most of these steps in automatic sequence, thereby reducing the amount of labor required and insuring a more uniform product.

What is claimed is:

1. A method for applying finely divided solid additive to the surfaces of carbon cloth layer components of a carbonaceous article, comprising:
   a. supporting two circular platens in spaced relationship to each other on a flat movable transfer arm, the platens having center supports for the alignment of circular layers of carbon cloth placed thereon;
   b. moving the transfer arm in back and forth movement about a first vertical pivot and a curved track in the flat surface, to alternately position each platen beneath the dispersion chamber;
   c. rotating each platen through a limited degree of rotation as the platen is positioned beneath the chamber, each platen rotating upon a second vertical pivot attached to the transfer arm;
   d. charging a measured amount of additive to the blowing tube, the additive charge being blown into and dispersed within the dispersion chamber by a stream of gas admitted to the tube, the end of the tube within the dispersion chamber being directed toward the closed end of the chamber, the additive then falling in a uniform layer upon a carbon cloth layer held on the platen; and
   e. causing a subsequent movement of the transfer arm to carry the platen with the coated carbon cloth layer into a position for manual addition of another disc, the same movement positioning the other platen and disc beneath the dispersion chamber.

2. A method according to claim 1 in which the additive comprises particles having average diameters ranging from about 50 microns to about 250 microns and the particles are dispersed within the chamber by blowing with a stream of gas.

3. A method according to claim 2 in which the additive is ditungsten boride and the gas is nitrogen.

* * * * *